United States Patent
Dutta et al.

(10) Patent No.: US 11,889,358 B2
(45) Date of Patent: Jan. 30, 2024

(54) SIDELINK RESOURCE REEVALUATION

(71) Applicant: QUALCOMM Incorporated, San Diego, CA (US)

(72) Inventors: Sourjya Dutta, San Diego, CA (US); Tien Viet Nguyen, Bridgewater, NJ (US); Gabi Sarkis, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/230,973

(22) Filed: Apr. 14, 2021

(65) Prior Publication Data

US 2021/0329501 A1 Oct. 21, 2021

Related U.S. Application Data

(60) Provisional application No. 63/011,992, filed on Apr. 17, 2020.

(51) Int. Cl.
*H04W 28/26* (2009.01)
*H04L 43/16* (2022.01)
*H04W 72/0446* (2023.01)

(52) U.S. Cl.
CPC ............ *H04W 28/26* (2013.01); *H04L 43/16* (2013.01); *H04W 72/0446* (2013.01)

(58) Field of Classification Search
CPC . H04W 28/26; H04W 72/0446; H04W 72/02; H04W 74/0808; H04W 4/46;
(Continued)

(56) References Cited

U.S. PATENT DOCUMENTS

2020/0280961 A1* 9/2020 Lee .................. H04W 72/10
2021/0160706 A1* 5/2021 Wu .................. H04B 7/0695
(Continued)

FOREIGN PATENT DOCUMENTS

WO 2019066629 A1 4/2019
WO 2020037536 A1 2/2020

OTHER PUBLICATIONS

Oppo 3GPP TSG-R#AN WG1 Meeting #100 E R1-2000493: Discussion on remaining open issue for mode 2 Feb. 2020 (Year: 2020).*
(Continued)

*Primary Examiner* — Rina C Pancholi
(74) *Attorney, Agent, or Firm* — Procopio, Cory, Hargreaves & Savitch LLP/QUALCOMM Incorporated

(57) ABSTRACT

In some aspects, a method of wireless communication includes performing a full reference signal receive power (RSRP) sweep for a first slot to determine a first resource exclusion RSRP threshold, and performing a resource reevaluation for a second slot based on the first resource exclusion RSRP threshold from the first slot. In some aspects, a method of wireless communication may include performing a full RSRP sweep for a first slot to determine a first resource exclusion RSRP threshold and performing the full RSRP sweep for a second slot that is a number of slots following the first slot to determine a second resource exclusion RSRP threshold. For each slot between the first slot and the second slot, the resource reevaluation may be performed based on the first resource exclusion RSRP threshold determined for the first slot.

41 Claims, 10 Drawing Sheets

(58) Field of Classification Search
CPC .............. H04W 4/70; H04W 72/0406; H04W 72/1231; H04W 72/1252; H04L 43/16
See application file for complete search history.

(56) References Cited

U.S. PATENT DOCUMENTS

2022/0377748 A1* 11/2022 He .................... H04L 1/1854
2022/0377749 A1* 11/2022 Lee .................... H04W 28/26

OTHER PUBLICATIONS

International Search Report and Written Opinion—PCT/US2021/027536—ISA/EPO—Aug. 20, 2021.
OPPO: "Discussion on Remaining Open Issue for Mode 2", 3GPP Draft, 3GPP TSG-RAN WG1 Meeting #100e, R1-2000493, 3rd Generation Partnership Project (3GPP), Mobile Competence Centre, 650, Route Des Lucioles, F-06921 Sophia-Antipolis Cedex, France, vol. RAN WG1 No. e-Meeting, Feb. 24, 2020- Mar. 6, 2020, Feb. 15, 2020 (Feb. 15, 2020), XP051853330, 14 Pages, URL: https://ftp.3gpp.org/tsg_ran/WG1_RL1/TSGR1_100_e/Docs/R1-2000493.zip. R1-2000493 OPPO-Mode 2 RA.docx [retrieved on Feb. 15, 2020], pp. 1-8. 2.Discussion, Section 2.2, p. 4.

* cited by examiner

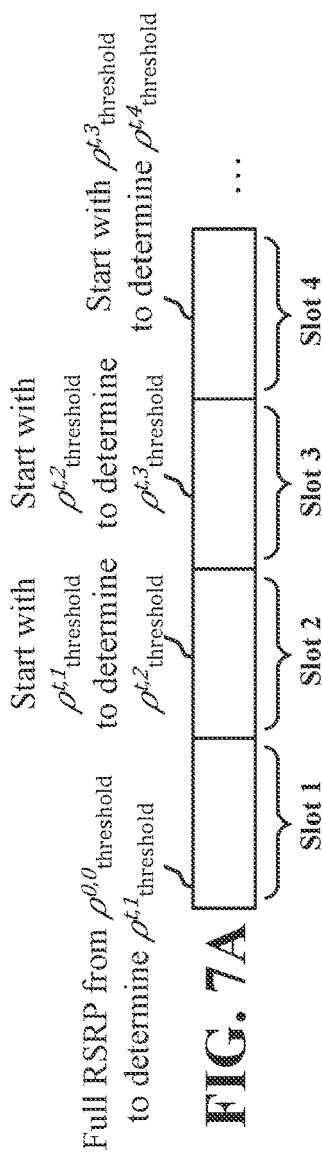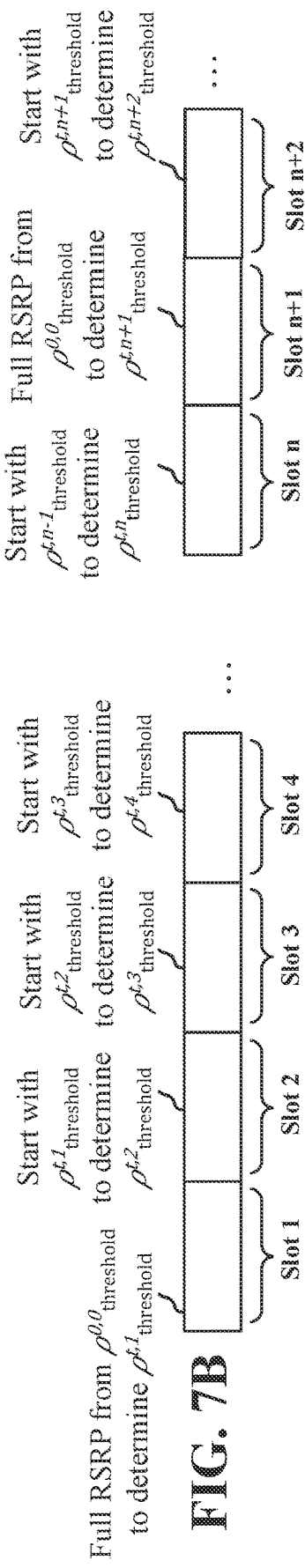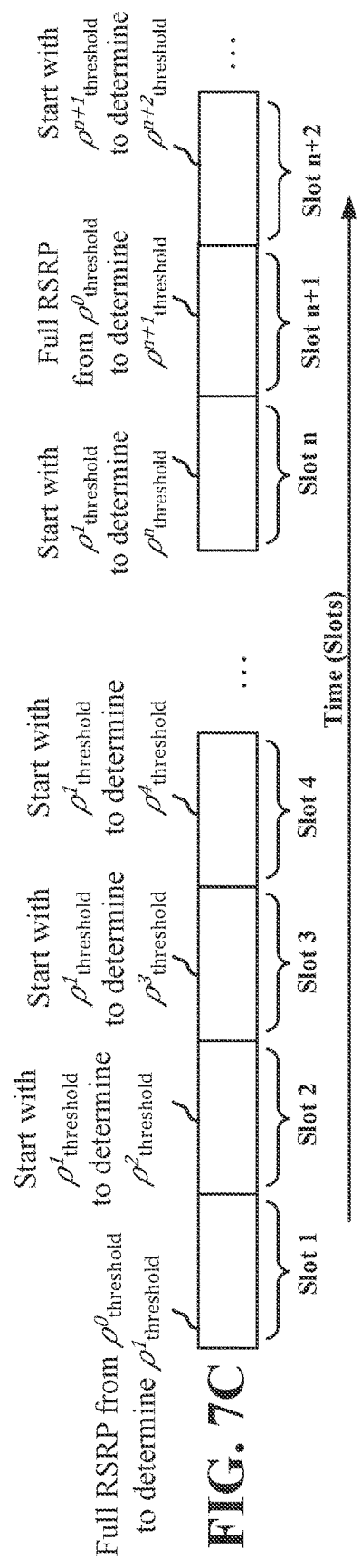

SIDELINK RESOURCE REEVALUATION

CROSS REFERENCE TO RELATED APPLICATION(S)

This application claims the benefit of U.S. Provisional Application Ser. No. 63/011,992, entitled "Sidelink Resource Reevaluation" and filed on Apr. 17, 2020, which is expressly incorporated by reference herein in its entirety.

INTRODUCTION

The present disclosure relates generally to communication systems, and more particularly, to sidelink communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise sidelink communication between devices, such as in V2X and/or other D2D communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication is provided. The method includes performing a full reference signal receive power (RSRP) sweep for a first slot to determine a first resource exclusion RSRP threshold, and performing a resource reevaluation for a second slot based on the first resource exclusion RSRP threshold from the first slot.

In another aspect of the disclosure, an apparatus for wireless communication is provided. The apparatus includes means for performing a full RSRP sweep for a first slot to determine a first resource exclusion RSRP threshold, and means for performing a resource reevaluation for a second slot based on the first resource exclusion RSRP threshold from the first slot.

In an aspect of the disclosure, an apparatus for wireless communication is provided. The apparatus includes a memory and at least one processor coupled to the memory, the memory and at least one processor configured to perform a full RSRP sweep for a first slot to determine a first resource exclusion RSRP threshold. The memory and the at least one processor are configured to perform a resource reevaluation for a second slot based on the first resource exclusion RSRP threshold from the first slot.

In an aspect of the disclosure, a non-transitory computer-readable storage medium for wireless communication is provided. The computer-readable medium stores computer executable code for wireless communication, the code when executed by a processor causes the processor to perform a full RSRP sweep for a first slot to determine a first resource exclusion RSRP threshold, and to perform a resource reevaluation for a second slot based on the first resource exclusion RSRP threshold from the first slot.

In another aspect of the disclosure, a method of wireless communication is provided. The method includes performing a full RSRP sweep for a first slot to determine a first resource exclusion RSRP threshold and performing the full RSRP sweep for a second slot that is a number of slots following the first slot to determine a second resource exclusion RSRP threshold. For each slot between the first slot and the second slot, the resource reevaluation may be performed based on the first resource exclusion RSRP threshold determined for the first slot.

In another aspect of the disclosure, an apparatus for wireless communication is provided. The apparatus includes means for performing a full RSRP sweep for a first slot to determine a first resource exclusion RSRP threshold and means for performing the full RSRP sweep for a second slot that is a number of slots following the first slot to determine a second resource exclusion RSRP threshold. The apparatus further includes means for performing a resource reevaluation for each slot between the first slot and the second slot based on the first resource exclusion RSRP threshold determined for the first slot.

In another aspect of the disclosure, an apparatus for wireless communication is provided. The apparatus includes a memory and at least one processor coupled to the memory, the memory and at least one processor configured to perform a full RSRP sweep for a first slot to determine a first resource exclusion RSRP threshold and perform the full RSRP sweep for a second slot that is a number of slots following the first slot to determine a second resource exclusion RSRP threshold. The memory and at least one processor coupled to the memory are further configured to perform a resource reevaluation for each slot between the first slot and the second slot based on the first resource exclusion RSRP threshold determined for the first slot.

In another aspect of the disclosure, a non-transitory computer-readable storage medium for wireless communication is provided. The computer-readable medium stores computer executable code for wireless communication, the code when executed by a processor causes the processor to perform a full RSRP sweep for a first slot to determine a first resource exclusion RSRP threshold and perform the full RSRP sweep for a second slot that is a number of slots following the first slot to determine a second resource exclusion RSRP threshold. The code is further configured to cause the processor to perform a resource reevaluation for each slot between the first slot and the second slot based on the first resource exclusion RSRP threshold determined for the first slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 7A-7C illustrate examples of resource reevaluation, in accordance with aspects presented herein.

DETAILED DESCRIPTION

Figure 1:
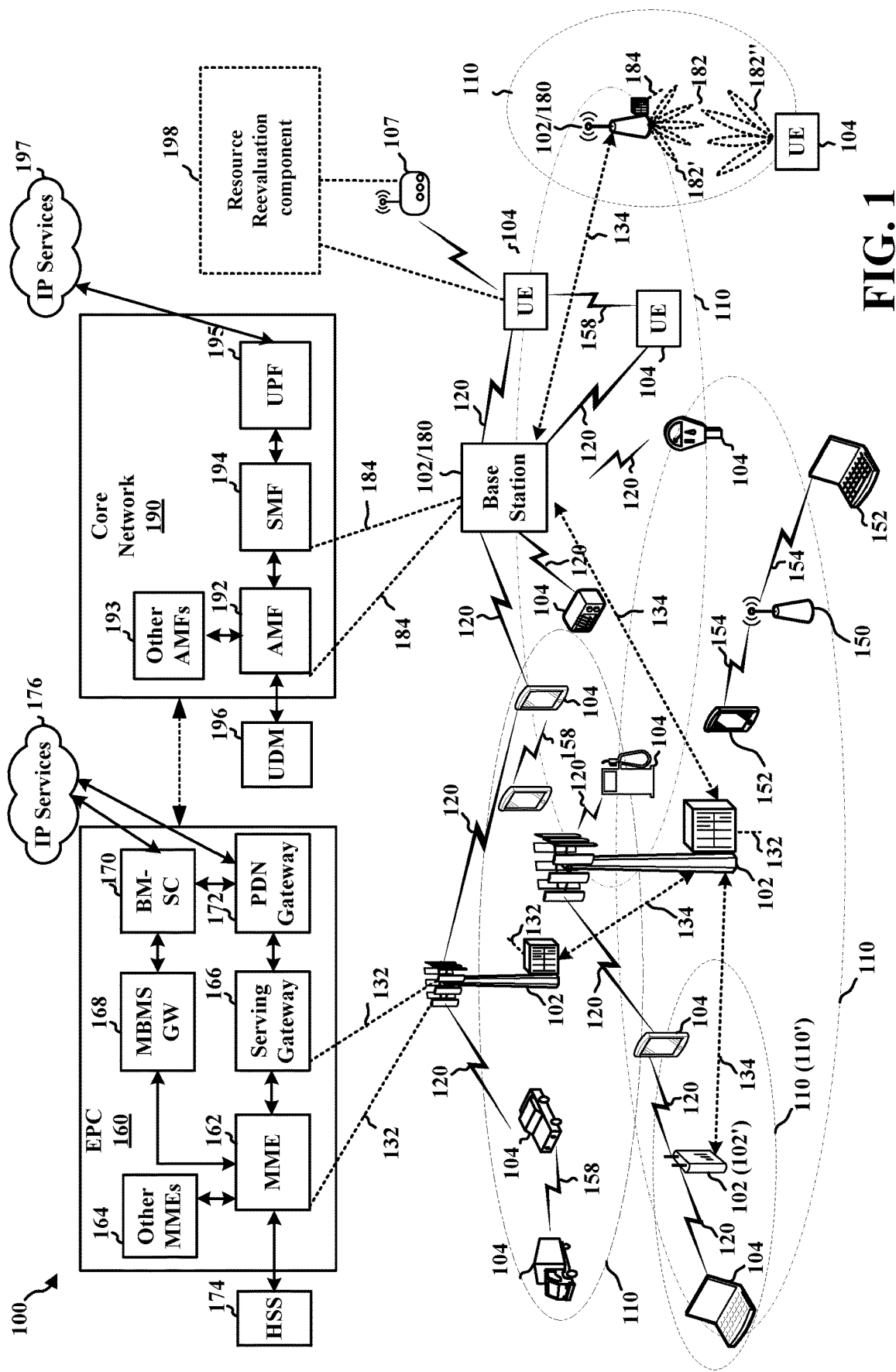
FIG. 1 is a diagram illustrating an example of a wireless communications system and an access network, in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

In some aspects, sidelink resource selection may be based on sensing in order to maintain a candidate resource set that a UE, or other wireless device, may select for sidelink transmission. As a part of the sensing, the UE may monitor for reservations of resources by other UEs. The UE may perform signal/channel measurement for a sidelink resource that has been reserved and/or used by other UE(s). An example of a signal/channel measurement is a reference signal received power (RSRP). As an example, the UE may measure the RSRP of a received message (e.g., SCI) that reserves a sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. The UE may perform a resource reevalulation, e.g., in connection with retransmission resources. If a UE performs resource reevaluation at each slot, overlapping resources reserved by other UEs may be detected quickly, e.g., once the SCI is received, and the UE may be able to react quickly to the updated channel occupancy. Resource reevaluation that is performed on a per slot basis may reduce latency and/or improve reliability by increasing the ability of the UE to select resources with less interference. The computation for a per slot resource reevaluation may involve multiple iterations of candidate resource consideration to determine an appropriate RSRP threshold for determining candidate resource set increasing an amount of processing at the wireless device. A "full RSRP sweep" or a "complete RSRP sweep" may refer to process of starting with the initial resource exclusion RSRP threshold (e.g., $\rho_{thresh}^0$) and adjusting the resource exclusion RSRP threshold until a candidate set includes the threshold percentage of the total resources. If the UE has multiple transport blocks to transmit, the UE may run multiple resource reevaluations per slot.

Aspects presented herein enable the wireless device to perform more frequent resource reevaluation, such as on per slot basis, with reduced processing by the UE. The present disclosure provides for a UE to perform a full RSRP sweep for a first slot to determine a first resource exclusion RSRP threshold, and then to perform a resource reevaluation for a second slot based on the first resource exclusion RSRP threshold from the first slot. By using the resource exclusion RSRP threshold for a prior slot rather than performing a full RSRP sweep, the UE may reduce the amount of processing to reevaluate resources for that slot. The more frequent resource reevaluation of the present disclosure provides for improved latency and reliability in combination with more efficient processing through the use of the resource exclusion RSRP threshold from a prior slot.

FIG. 1 is a diagram illustrating an example of a wireless communications system and an access network 100 including device(s) configured to perform the resource reevaluation aspects described herein. In some aspects, the UE 104, the RSU 107, and/or other devices communicating based on sidelink may comprise a resource reevaluation component 198 configured to perform a full RSRP sweep for a first slot to determine a first resource exclusion RSRP threshold, select sidelink resources for a transmission, and perform a resource reevaluation for a second slot based on the first resource exclusion RSRP threshold from the first slot. The use of the resource exclusion RSRP threshold from a prior slot to perform resource reevaluation may reduce a number of iterations performed by the UE and may reduce the processing required at each slot. In some examples, the resource reevaluation component 198 may be configured to perform the full RSRP sweep at a third slot a number of slots following the first slot.

In some aspects, the resource reevaluation component 198 may be configured to perform a full RSRP sweep for a first slot to determine a first resource exclusion RSRP threshold and perform the full RSRP sweep for a second slot that is a number of slots following the first slot to determine a second resource exclusion RSRP threshold. The memory and at least one processor coupled to the memory are further configured to perform a resource reevaluation for each slot between the first slot and the second slot based on the first resource exclusion RSRP threshold determined for the first slot.

Some wireless communication may be based on sidelink, and may include transmissions directly between wireless devices. Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

The wireless communications system and access network 100 in FIG. 1 (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30

GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
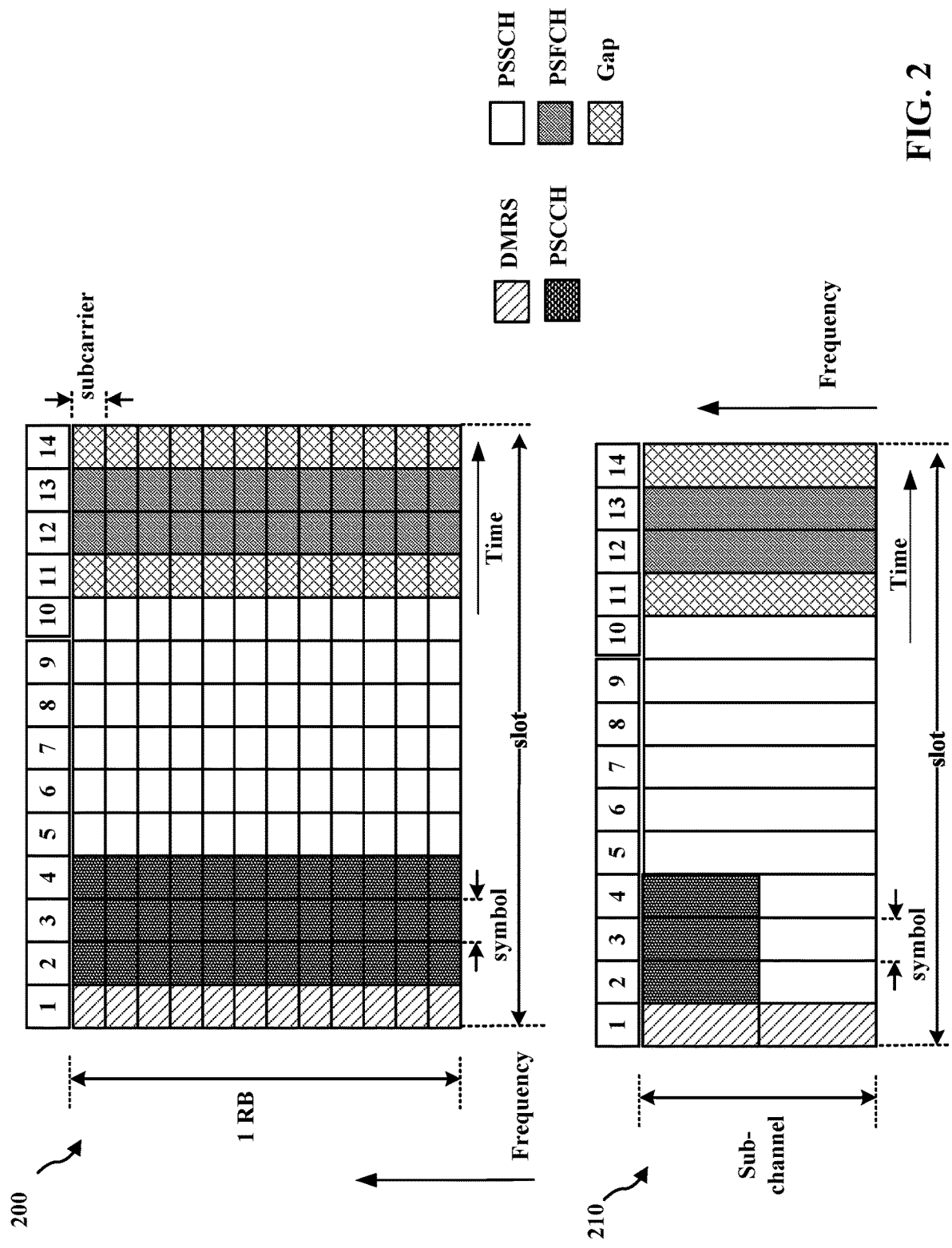
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
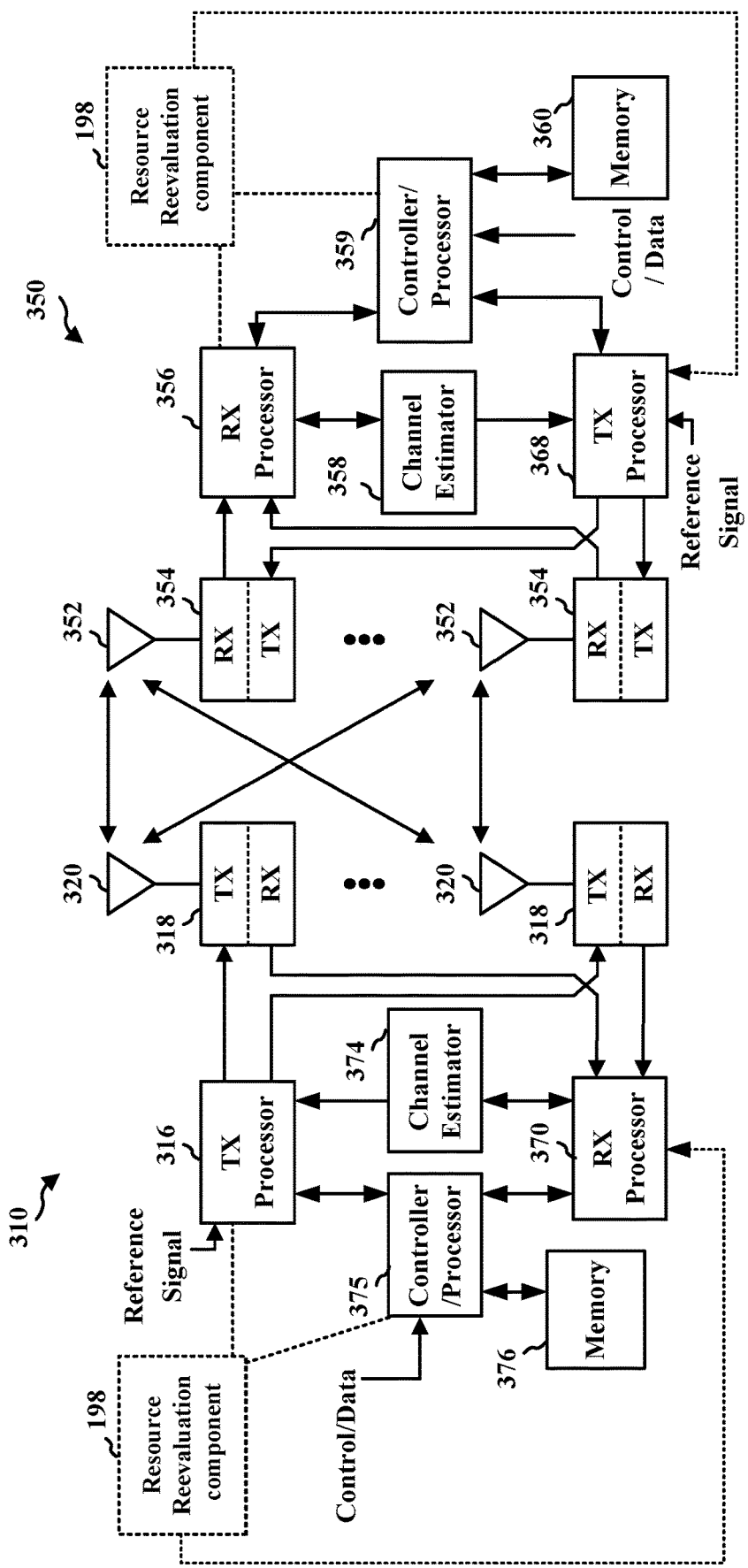
FIG. 3 is a diagram illustrating an example of a first device and a second device involved in wireless communication based, e.g., on sidelink communication, in accordance with aspects presented herein.

FIG. 3 is a block diagram 300 of a first wireless communication device 310 in communication with a second wireless communication device 350, e.g., via V2X or other D2D communication. The communication may be based, e.g., on sidelink using a PC5 interface. The transmitting device 310 and the 350 may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with the resource reevaluation component 198 of FIG. 1.

Figure 4:
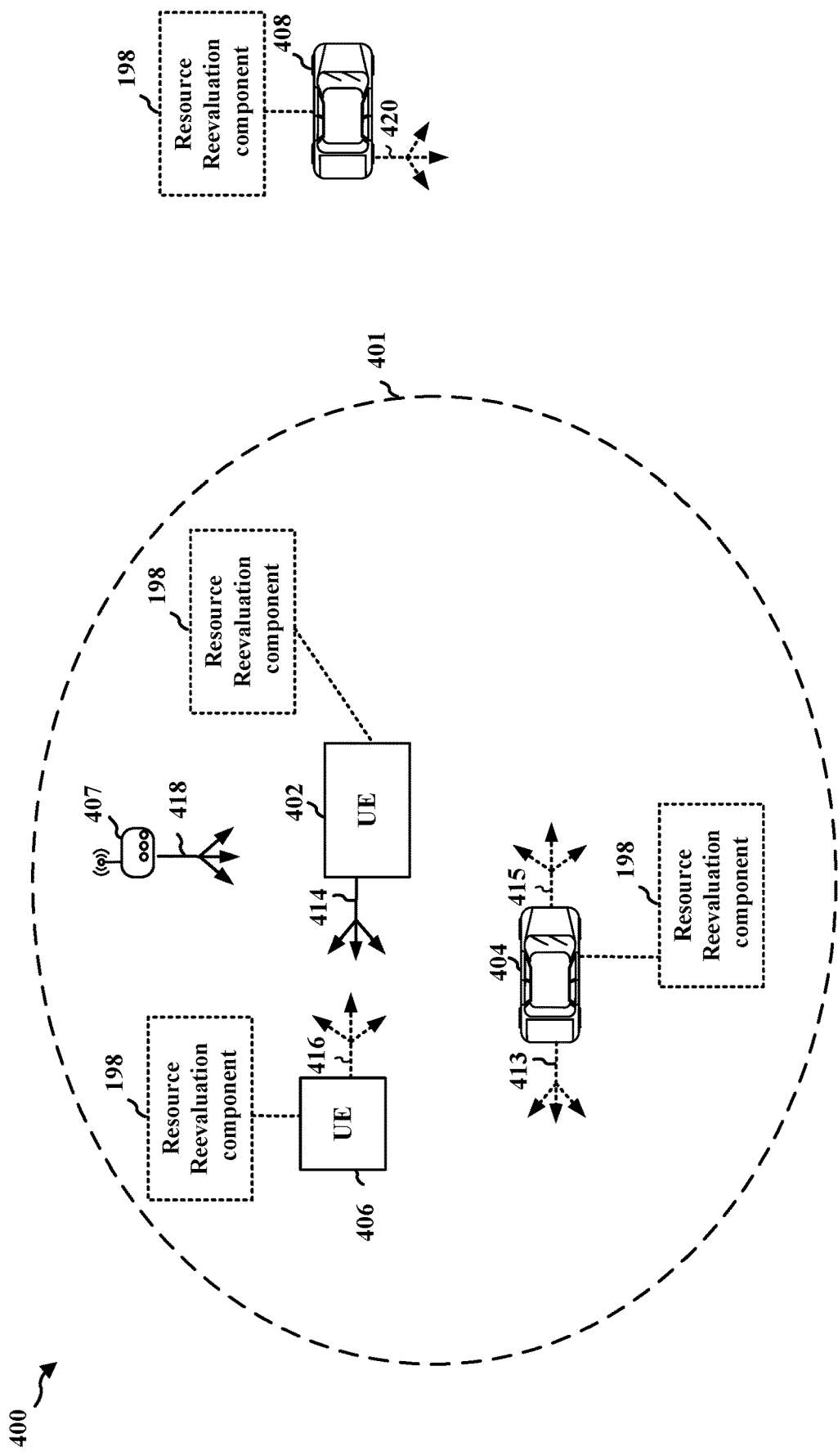
FIG. 4 illustrates example aspects of sidelink communication between devices, in accordance with aspects presented herein.

FIG. 4 illustrates an example 400 of wireless communication between devices based on sidelink, such as V2X or other D2D communication. The communication may be based on a slot structure. As an example, the slot structure may comprise aspects described in connection with FIG. 2. For example, UE 402 may transmit a transmission 414, e.g., comprising a control channel (e.g., PSCCH) and/or a corresponding data channel (e.g., PSSCH), that may be received by UEs 404, 406, 408. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 404, 406, 408 are illustrated as transmitting a transmissions 413, 415, 416, 420. The transmissions 413, 414, 415, 416, 420 may be unicast, broadcast or multicast to nearby devices. For example, UE 404 may transmit communication 413, 415 intended for receipt by other UEs within a range 401 of UE 404, and UE 406 may transmit communication 416. Additionally/alternatively, RSU 407 may receive communication from and/or transmit communication 418 to UEs 402, 404, 406, 408. One or more of the UEs 402, 404, 406, 408 or the RSU 407 may comprise a resource reevaluation component 198 as described in connection with FIG. 1.

Devices communicating based on sidelink, may determine one or more radio resources in the time and frequency domain that are used by other devices in order to select transmission resources that avoid collisions with other devices.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a sidelink UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. The sidelink transmission and/or the resource reservation may be periodic or aperiodic, where a UE may reserve resources for transmission in a current slot and up to two future slots (discussed below).

Thus, in the second mode (e.g., Mode 2), individual devices may autonomously select resources for sidelink transmission, e.g., without a central entity such as a base station indicating the resources for the device. A first device may reserve the selected resources in order to inform other devices about the resources that the first device intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
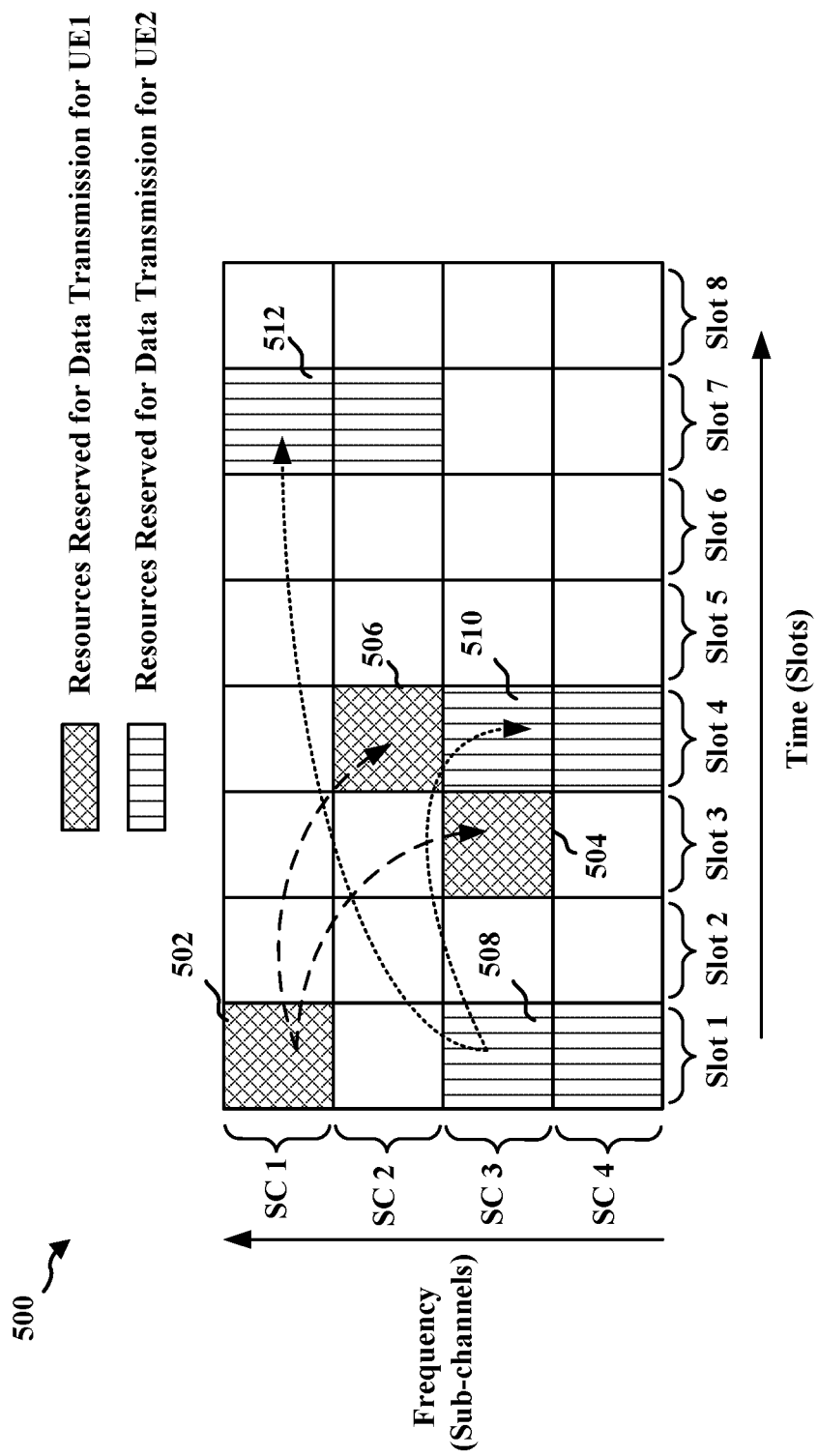
FIG. 5 illustrates examples of resource reservation for sidelink communication.

FIG. 5 is an example 500 of time and frequency resources showing reservations for sidelink transmissions. The resources may be comprised in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 5 illustrates that a second UE ("UE2") reserves resources in sub-channels SC 3 and SC 4 at time slot 1 for its current data transmission 508, and reserve first data retransmission 510 at time slot 4 using sub-channels SC 3 and SC 4, and reserve second data retransmission 512 at time slot 7 using sub-channels SC 1 and SC 2 as shown by FIG. 5. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the UE may transmit SCI reserving resources for data transmissions 508, 510, and 512.

There may be a timeline for a sensing-based resource selection. As the UE senses and decodes the SCI received from other UEs during a sensing window, e.g., a time duration prior to resource selection during which the UE monitors or stores resource reservations from other UEs.

Figure 6:
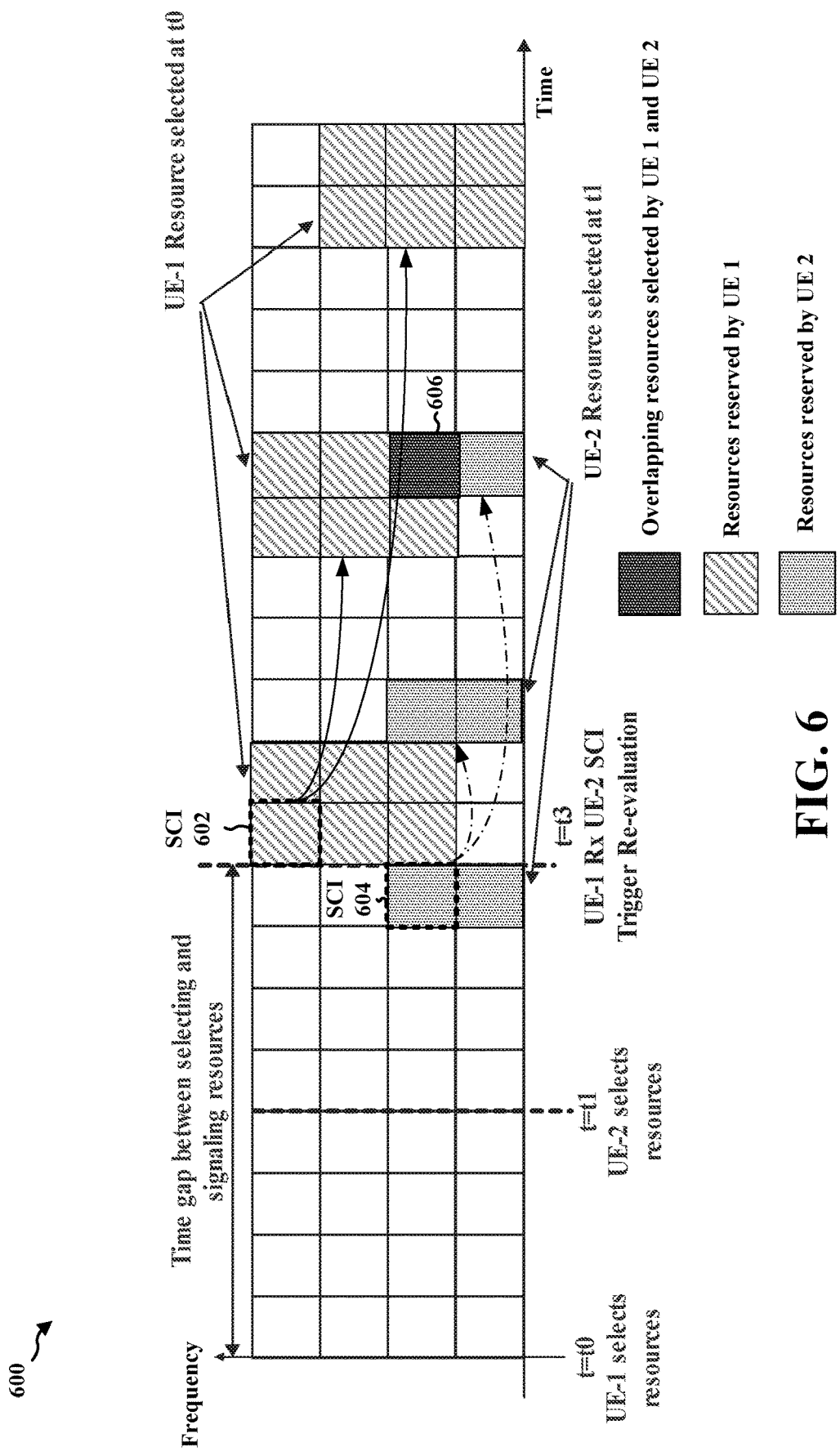
FIG. 6 illustrates examples of resource reservation for sidelink communication.

Based on the sensing history, the UE may be able to determine available candidate resources for a duration of time after the selection by excluding resources that are reserved by other UEs. FIG. 6 illustrates an example time diagram 600 for resource evaluation and selection in connection with the aspects described herein. In FIG. 6, at time t0, a first UE may select resources from its determined candidate resources. There may be a time gap between the first UE's selection of the resources and the first UE transmitting SCI reserving the resources at time t3, e.g., at 602. The time gap between t1 and t3 may be for processing by the first UE and/or preparing for transmission by the first UE. A second UE may select resources at time t2, and may have a shorter time gap between selection of the resources and transmission of the SCI 604 that reserves the resources. As illustrated in FIG. 6, the second UE may transmit the SCI 604 between the time at which the first UE selects the resources at t0 and the time at which the first UE reserves the resources at t3. FIG. 6 illustrates that the second UE reserves resources that overlap with the resources selected by the first UE. The first UE may continue the sensing or monitoring for the SCI from other UEs between the resource selection at time=t1 and a transmission (e.g., transmission of SCI 602 at t3 and/or transmission of resources indicated in the SCI). The earlier SCI 604 reserves the retransmission resources at 606 so that the first UE may not use the overlapping resources. A longer the distance between t0 and t3 may lead to a greater potential for selected resources to have intervening reservations by other UEs.

A UE may perform a resource reevaluation, e.g., when previously selected resources are reserved in SCI for a transmission from a peer UE. In FIG. 6, the first UE may perform a resource reevaluation and may perform a resource reselection for the retransmission resources. If a UE performs resource reevaluation at each slot, overlapping resources reserved by other UEs may be detected quickly, e.g., once the SCI is received, and the UE may be able to react quickly to the updated channel occupancy. Resource reevaluation that is performed on a per slot basis may reduce latency and/or improve reliability by increasing the ability of the UE to select resources with less interference. However, resource reevaluation may be computationally expensive and may require a significant amount of processing by the UE on a per slot basis. If the UE has multiple transport blocks to transmit, the UE may run multiple resource reevaluations per slot.

A part of the computational load for resource reevaluation is due to the determination of an RSRP threshold to use in determining the candidate set of resources. As discussed above, the UE may exclude resources reserved by another UE in a signal that is received having an RSRP above a threshold. In some examples, the RSRP threshold may be based on the amount of available resources. For example, if the amount of available resources is below a threshold (e.g., below 20%) within a selection window, the UE may use an increased RSRP threshold so that the UE is more likely to be able to reuse reserved resources. Similarly, the UE may decrease the RSRP when there is a larger amount of available resources, e.g., to minimize the chance of possible collision.

As an example, the UE may use an initial RSRP threshold $\rho_{thresh}^{0}$ thresh, which may be referred to herein as an initial resource exclusion RSRP threshold. If the measured RSRP for an SCI reserving resources is greater than $\rho_{thresh}^{0}$, the UE may remove the reserved resources from the candidate set that overlap with the reserved resources. The UE may perform a comparison to the initial resource exclusion RSRP threshold and removal of resources from the candidate set for resources reserved in multiple SCI received from one or more UEs. If the number of remaining resources in the candidate set is less than a threshold amount, e.g., a resource free criteria or resource free threshold x %, of the total number of resources, the UE may increase the resource exclusion RSRP threshold. For example, the UE may increment the RSRP threshold by a particular amount. In an example in which the increment is 3 dB, the UE may increase the initial resource exclusion RSRP threshold $\rho_{thresh}^{0}$ by 3 dB, i.e., $\rho_{thresh}^{t}=\rho_{thresh}^{0}+3$ dB. If the number of remaining resources in the candidate set is still below x % of the total resources, the UE may continue to increase the RSRP threshold, e.g., $\rho_{thresh}^{t+1}=\rho_{thresh}^{t}+3$ dB for t=0, 1, 2, 3 and so forth until the number of remaining resources in the candidate set meets or exceeds x % of the total resources. The UE may stop at the threshold at which the candidate set includes the threshold percentage of the total resources. The process of starting with the initial resource exclusion RSRP threshold $\rho_{thresh}^{0}$ thresh and adjusting the resource exclusion RSRP threshold until the candidate set includes the threshold percentage of the total resources may be referred to as a full RSRP sweep or a complete RSRP sweep.

The number of iterations to perform the full RSRP sweep may be large, especially when a network load is high. As an example, if $\rho_{thresh}^{0}=-99$ dBm, in order to obtain a candidate set with 20% of the total resources, the UE may set $\rho_{thresh}^{0}=-69$ dBm. This may involve 11 iterations using the 3 dB example of incremental increases to the resource exclusion RSRP threshold. If the UE performs resource reevaluation per slot, the UE performs 11 iterations per slot. Aspects presented herein enable the UE to achieve the latency and reliability benefits of per slot resource reevaluation based on a more efficient computation that reduces the computational load on the UE for reevaluation. As presented herein, the UE may use results from a previous RSRP sweep when performing a future resource reevaluation. The full RSRP sweep may be performed once or in a reduced/infrequent manner. The UE may store a final resource exclusion RSRP threshold value from the full RSRP sweep and use the stored value to perform resource reevaluation in one or more subsequent slots. The use of the previously determined resource exclusion RSRP threshold value reduced the time complexity for the UE to perform resource reevaluation on a per slot basis. As the UE performs the reevaluation per slot, interference conditions may be similar to the earlier slot, and the UE may perform a reduced number of iterations to determine an updated resource exclusion RSRP threshold. In some examples, a single iteration may be used in a slot.

In a first type of resource reevaluation, a UE may have a resource free threshold x % and a resource exclusion RSRP threshold (e.g., $\rho_{thresh}^{0,0}$) configured or defined. The resource exclusion RSRP threshold may also be referred to herein as an RSRP threshold or an RSRP exclusion upper limit.

When a new transport block arrives, or becomes ready, for transmission from the UE using sidelink, the UE may perform a complete resource evaluation. The complete resource evaluation may be referred to as a full or complete RSRP sweep. As described above, the UE may measure RSRP for each received SCI that reserves resources. If the measured RSRP is greater than $\rho_{thresh}^{0,0}$, the UE may remove the reserved resources from the candidate set that overlap with the reserved resources. If the number of remaining resources in the candidate set is less than the resource free threshold (x %), of the total number of resources in the candidate set, the UE may increase, or increment, the resource exclusion RSRP threshold. In an example in which the increment is 3 dB, the UE may increase the initial resource exclusion RSRP threshold $\rho_{thresh}^{0,0}$ by 3 dB, i.e., $\rho_{thresh}^{t,0}=\rho_{thresh}^{0,0}+3$ dB. If the number of remaining resources in the candidate set is still below x % of the total resources, the UE may continue to increase the RSRP threshold, e.g., $\rho_{thresh}^{t+1,0}=\rho_{thresh}^{t,0}+\Delta dB$ for t=0, 1, 2, 3 and so forth until the number of remaining resources in the candidate set meets or exceeds x % of the total resources. A corresponds to the increment value, which may be configured, defined, etc. The UE may stop at the threshold (e.g., referred to as $\rho_{thresh}^{t,0}$) at which the candidate set includes the threshold percentage of the total resources.

In the next slot, the UE perform resource reevaluation starting from the final RSRP threshold of the previous slot, e.g., setting $\rho_{thresh}^{0,1}=\rho_{thresh}^{t,0}$. The UE may increase the RSRP threshold, e.g., by $\rho_{thresh}^{t+1,1}=\rho_{thresh}^{t,1}+\Delta dB$ for t=0, 1, 2, 3 and so forth until the number of remaining resources in the candidate set meets or exceeds x % of the total resources. If the percentage of remaining resources in the candidate set is not less than x %, the UE may store the current threshold value as $\rho_{thresh}^{t,1}$. In some examples, the UE may decrease the RSRP threshold, e.g., by $\rho_{thresh}^{t+1,1}=\rho_{thresh}^{t,1}-\Delta dB$ for t=0, 1, 2, 3 and so forth until the number of remaining resources in the candidate set is not less than a threshold percentage. In some examples, the threshold percentage may be x % of the total resources.

FIG. 7A illustrates an example of this first type of resource reevaluation. As illustrated in FIG. 7A, the resource evaluation in a slot is based on an RSRP threshold determined in a prior slot. If traffic conditions are relatively stable, the conditions may be similar from slot to slot. Therefore, the UE may perform reduced iterations in each slot before reaching a final RSRP threshold for resource reevaluation in the slot. In some examples, the UE may perform a single iteration. The resource reevaluation may provide the same result as performing a full RSRP sweep each slot.

In a second type of resource reevaluation, the UE may perform the complete resource evaluation, including a full RSRP sweep beginning from $\rho_{thresh}^{0}$ thresh every n slots, or whenever possible. The number of slots between the full RSRP sweep (e.g., n) may be determined by the UE or may be configured. In some examples, n may be configured in RRC signaling, etc. The full RSRP sweep in the complete resource evaluation may provide an RSRP threshold $\rho_{thresh}^{t}$, which the UE uses to perform resource reevaluation for each slot between the slots in which the full RSRP sweep is performed. FIG. 7C illustrates that in slot 1, a full RSRP sweep using a starting resource exclusion RSRP threshold of $\rho_{thresh}^0$ returns a final threshold of $\rho_{thresh}^1$. The threshold $\rho_{thresh}^1$ determined in slot 1 is used as the starting resource exclusion RSRP threshold for resource reevaluation for slots 2, 3, 4, and so forth up to slot n. At slot n+1, the UE again performs the complete resource evaluation including the full RSRP sweep from $\rho_{thresh}^0$, rather than from $\rho_{thresh}^1$, to determine $\rho_{thresh}^2$. In slot n+2, the UE uses $\rho_{thresh}^2$ as the starting resource exclusion RSRP threshold for resource reevaluation. The UE continues to apply $\rho_{thresh}^2$ as the starting resource exclusion RSRP threshold for resource reevaluation in slots n+3 up to slot 2n. At slot 2n+1, the UE again performs the full RSRP sweep.

As an example, if n=16, a complete resource evaluation from the defined, configured initial resource exclusion RSRP threshold ($\rho_{thresh}^0$) may be performed every 16 slots. In slots 2-15, the UE may use the resource exclusion RSRP threshold determined in slot 1 as a starting RSRP threshold for the resource reevaluation. The UE may increment/decrement the RSRP threshold in individual slots until the resource free threshold x % is met, as described in connection with FIG. 7A. However, in a subsequent slot, the UE will use the RSRP threshold determined in slot 1 as a starting threshold.

The UE may also apply a combination of aspects of the first type of resource reevaluation, as described in connection with FIG. 7A, and the second type of resource reevaluation, as described in connection with FIG. 7B. For example, the UE may perform a full RSRP sweep as part of a complete resource evaluation starting from $\rho_{thresh}^0$ every n slots, e.g., in slot 1 and slot n+1 in FIG. 7B. In the slots between 1 and n+1, the UE uses $\rho_{thresh}^{t,1}$ as the starting resource exclusion RSRP threshold for the resource reevaluation. The UE may increment/decrement the RSRP threshold in individual slots until the resource free threshold x % is met, as described in connection with FIG. 7A. For example, in slot 3, the UE may use the resource exclusion RSRP $\rho_{thresh}^{t,2}$ that was determined in slot 2. In slot 3, the UE may use $\rho_{thresh}^{t,3}$ that was determined in slot 3, and so forth up until slot n+1. At slot n+1, the UE the UE again performs the complete resource evaluation including the full RSRP sweep from $\rho_{thresh}^{0,0}$ rather than from $\rho_{thresh}^{t,n}$, determine $\rho_{thresh}^{t,n+1}$. In slot n+2, the UE uses $\rho_{thresh}^{t,n+1}$ as the starting resource exclusion RSRP threshold for resource reevaluation. The UE then returns to the first type resource reevaluation in which the starting RSRP threshold for a slot is based on the final RSRP threshold determined in the prior slot up to slot 2n. At slot 2n+1, the UE again performs the full RSRP sweep.

In some examples, the UE may determine the type of resource reevaluation to apply, e.g., whether to apply the first type described in connection with FIG. 7A, the second type described in connection with FIG. 7C, or a combination of the first type and the second type, as described in connection with FIG. 7B.

Alternatively, or additionally, the UE may receive configuration information that the UE uses to determine the type of resource reservation algorithm to employ. In some examples, the UE may receive RRC signaling, e.g., from a base station, an RSU, or a synchronization UE ("sync UE"). with configuration information for resource reevaluation. In some examples, the configuration may be received in part of an inter-UE RRC connection setup or update procedure. The configuration may include any of a candidate resource free threshold for the resource reevaluation (e.g., x %, which may be indicated as a fraction, a percentage, etc.), an initial resource exclusion RSRP (e.g., $\rho_{thresh}^0$ or $\rho_{thresh}^{0,0}$), a step size (e.g., $\Delta$) for resource exclusion RSRP increments or decrements, an indication of the number (n) of slots between full RSRP sweeping or complete resource evaluation, or an indication of the type of per slot resource reevaluation to employ (e.g., whether to employ the first type described in connection with FIG. 7A, the second type described in connection with FIG. 7C, or a combination of the first type and the second type, as described in connection with FIG. 7B).

Figure 8:
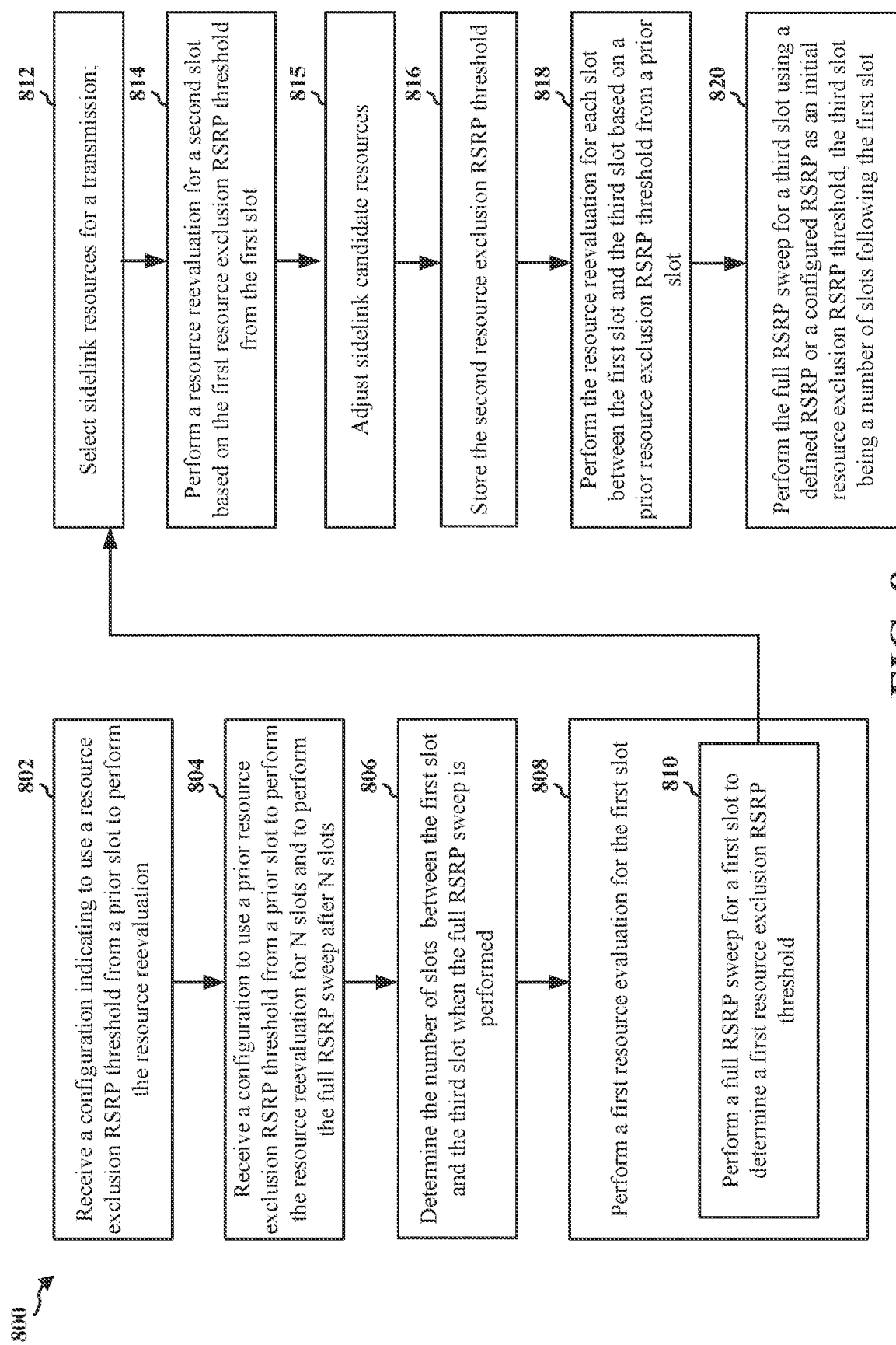
FIG. 8 is an example flowchart of a method of wireless communication including resource reevaluation using a resource exclusion RSRP threshold determined in a prior slot.

FIG. 8 is a flowchart 800 of a method of wireless communication. The method may be performed by a wireless device that communicates using sidelink. In some examples, the method may be performed by a UE or a component of a UE (e.g., the UE 104; the device 310 or 350, which may include memory and which may be an entire device or a component of a device; the apparatus 1002). In other examples, the wireless device may comprise an RSU or other device that selects resources for sidelink communication. One or more aspects illustrated in FIG. 8 may be optional. Various implementations may include a method with any combination of the aspects described in connection with FIG. 8. The method enables the wireless device to reevaluate resources in a frequent manner, such as per slot, in a more efficient manner.

At 810, the device performs a full RSRP sweep for a first slot to determine a first resource exclusion RSRP threshold. The first resource exclusion RSRP threshold may be determined using a defined RSRP or a configured RSRP as an initial resource exclusion RSRP threshold. As an example, the first resource exclusion RSRP that is used to perform the full RSRP sweep may be $\rho_{thresh}^0$. Performing the full RSRP sweep may include starting from $\rho_{thresh}^0$ and incrementing the RSRP threshold until a candidate set is at least x % of the total resources, as described above. The RSRP sweep may be performed by the RSRP sweep component 1040 of the apparatus 1002 in FIG. 10. As illustrated at 808, the wireless device may perform a first resource evaluation for the first slot. The resource reevaluation may be performed, e.g., by the resource evaluation component 1044 of the apparatus 1002 in FIG. 10. The full RSRP sweep may be performed, at 810, for the first resource evaluation for the first slot.

At 812, the wireless device may select one or more sidelink resources for a transmission and/or a retransmission, e.g., based on the full RSRP sweep for the first slot. The wireless device may select the sidelink resources, e.g., as described in connection with the sensing based resource allocation in any of FIGS. 4-6. For example, the UE may maintain a set of candidate resources and may select the one or more resources from the set of candidate resources. The selection may be performed, e.g., by the sidelink resource selection component 1042 of the apparatus 1002 in FIG. 10.

At 814, the wireless device performs a resource reevaluation for a second slot based on the first resource exclusion RSRP threshold from the first slot, e.g., as described in connection with FIGS. 7A-7C. The wireless device may determine a candidate set of potential resources by removing resources that are reserved through SCI received from other UEs. In determining which potential resources to remove, the wireless device may determine to remove reserved resources for SCI that is received with a measured RSRP that meets a threshold. The resource reevaluation may be performed, e.g., by the resource evaluation component 1044 of the apparatus 1002 in FIG. 10. After selecting the one or more sidelink resources at 812, the UE may adjust the one or more sidelink candidate resources for the sidelink transmission based on the resource reevaluation for the second slot, e.g., as illustrated at 815. The adjustment may be performed, e.g., by the sidelink resource selection component 1042 of the apparatus 1002 in FIG. 10.

Performing the resource reevaluation for the second slot, at 814, may include determining a second resource exclusion RSRP threshold, e.g., by incrementing or decrementing the first resource exclusion RSRP threshold from the first slot. For example, the wireless device may increment the RSRP threshold if the available number of candidate resources in candidate set is below the candidate resource free threshold (e.g., x %) based on the current RSRP threshold. The wireless device may decrement the RSRP threshold if the available number of candidate set is above a threshold (e.g., a particular percentage of the total resources in the selection window), based on the current the RSRP threshold. In some examples, the threshold may be the same as the threshold for incrementing the RSRP (e.g., x %). In other examples, the threshold for decrementing the RSRP threshold may be different than the threshold to increment the RSRP threshold.

As illustrated at 816, the wireless device may store the second resource exclusion RSRP threshold for use in a following slot. The resource reevaluation for the second slot may use the first resource exclusion RSRP threshold as an initial resource exclusion RSRP threshold, e.g., rather than using a configured or defined initial resource exclusion RSRP threshold that is used in the full RSRP sweep. The storage may be performed, e.g., by the RSRP threshold component 1046 of the apparatus 1002 in FIG. 10.

During the resource reevaluation for the second slot, the initial resource exclusion RSRP threshold (e.g., the first resource exclusion RSRP threshold from the first slot) incremented or decremented to determine configured resource free criteria. Then, as illustrated at 816, the wireless device may store an updated resource exclusion RSRP threshold for a third slot, e.g., the incremented/decremented threshold for the second slot. The storage may be performed, e.g., by the RSRP threshold component 1046 of the apparatus 1002 in FIG. 10.

In some examples, the wireless device may be configured with an algorithm to use for resource reevaluation. For example, at 802, the wireless device may receive a configuration indicating to use a resource exclusion RSRP threshold from a prior slot to perform the resource reevaluation, e.g., based on the first type of resource reevaluation described above in connection with FIG. 7A. The configuration may further include one or more of a candidate resource free threshold for the resource reevaluation (e.g., x %, which may be indicated as a fraction, a percentage, etc.)), an initial resource exclusion RSRP (e.g., $\rho_{thresh}^0$) or a step size for resource exclusion RSRP increments or decrements. The configuration may be received by the configuration component 1048 of the apparatus 1002 in FIG. 10.

As illustrated at 820, the wireless device may, again, perform the full RSRP sweep for a third slot using a defined RSRP or a configured RSRP (e.g., $\rho_{thresh}^0$) as an initial resource exclusion RSRP threshold, the third slot being a number of slots following the first slot. The full RSRP sweep may be similar to the full RSRP sweep described for 810. In an example, the wireless device may perform the full RSRP sweep every 10 slots. The example of 10 slots is merely one example to illustrate the concept. The concept may be applied to any number of slots, e.g., performing the full RSRP sweep at a periodicity of more than 10 slots or less than 10 slots. The RSRP sweep may be performed by the RSRP sweep component 1040 of the apparatus 1002 in FIG. 10.

As illustrated at 804, the wireless device may receive a configuration indicating to use a prior resource exclusion RSRP threshold from a prior slot to perform the resource reevaluation for slots between the first slot and the third slot and to perform the full RSRP sweep using the defined RSRP or the configured RSRP as the initial resource exclusion RSRP threshold after the number of slots. For example, the configuration may indicate to the wireless device to apply a combination of the first type of resource reevaluation (e.g., use an initial resource exclusion RSRP threshold calculated for a prior slot) and the second type of resource reevaluation (e.g., performing a full RSRP sweep every n slots), as described in connection with FIG. 7B. The configuration may further include one or more of: the number of slots between the first slot and the third slot when the full RSRP sweep is to be performed, a candidate resource free threshold for the resource reevaluation (e.g., x %, which may be indicated as a fraction, a percentage, etc.), an initial resource exclusion RSRP (e.g., $\rho_{thresh}^0$) or a step size for resource exclusion RSRP increments or decrements. The configuration may be received by the configuration component 1048 of the apparatus 1002 in FIG. 10.

In some examples, the wireless device may determine, autonomously, the number of slots between the first slot and the third slot when the full RSRP sweep is performed, e.g., at 806. For example, the UE may autonomously determine the periodicity for performing the full RSRP sweep rather than receiving a configured number of slots for the periodicity in higher layer signaling or signaling from a network, e.g., in the configuration at 804. The determination may be performed by the RSRP sweep component 1040 of the apparatus 1002 in FIG. 10.

As illustrated at 818, the wireless device may perform the resource reevaluation for each slot between the first slot and the third slot based on a prior resource exclusion RSRP threshold from a prior slot. As discussed above, the wireless device uses the first resource exclusion RSRP threshold (e.g., $\rho_{thresh}^{t,1}$), determined for the first slot, at 810, to perform the resource reevaluation for the second slot, at 814. The resource reevaluation may be performed, e.g., by the resource evaluation component 1044 of the apparatus 1002 in FIG. 10. The wireless device may then use the resource exclusion RSRP threshold from the second slot (e.g., $\rho_{thresh}^{t,2}$) (whether incremented, decremented, or unchanged from the first slot's RSRP threshold) to perform the resource reevaluation for the next consecutive slot. The wireless device may then use the resource exclusion RSRP threshold from the next slot (e.g., $\rho_{thresh}^{t,3}$) perform resource reevaluation for the following consecutive slot, and so forth until reaching the slot that is n slots following the first slot, at which point the wireless device performs the full RSRP sweep from $\rho_{thresh}^0$.

Figure 9:
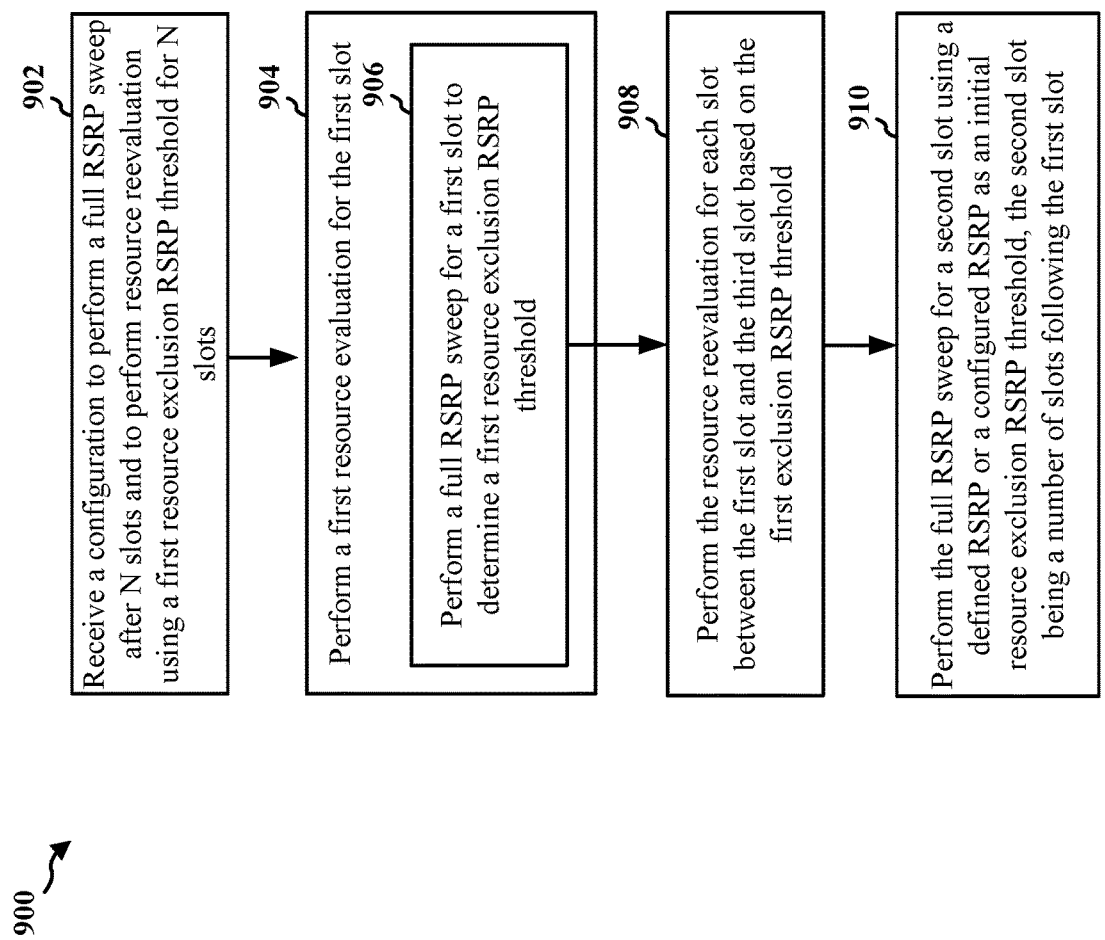
FIG. 9 is an example flowchart of a method of wireless communication including resource reevaluation using a resource exclusion RSRP threshold determined in a prior slot.

FIG. 9 is a flowchart 900 of a method of wireless communication. The method may be performed by a wireless device that communicates using sidelink. In some examples, the method may be performed by a UE or a component of a UE (e.g., the UE 104; the device 310 or 350, which may include memory and which may be an entire device or a component of a device; the apparatus 1002). In other examples, the wireless device may comprise an RSU or other device that selects resources for sidelink communication. One or more aspects illustrated in FIG. 9 may be optional. Various implementations may include a method with any combination of the aspects described in connection with FIG. 9. The method enables the wireless device to reevaluate resources in a frequent manner, such as per slot, in a more efficient manner.

At 906, the wireless device performs a full RSRP sweep for a first slot to determine a first resource exclusion RSRP threshold. The first resource exclusion RSRP threshold may be determined using a defined RSRP or a configured RSRP as an initial resource exclusion RSRP threshold. As an example, the first resource exclusion RSRP that is used to perform the full RSRP sweep may be $\rho_{thresh}^0$. Performing the full RSRP sweep may include starting from $\rho_{thresh}^0$ and incrementing the RSRP threshold until a candidate set is at least x % of the total resources, as described above. As illustrated at 904, the wireless device may perform a first resource evaluation for the first slot. The resource evaluation may be performed, e.g., by the resource evaluation component 1044 of the apparatus 1002 in FIG. 10. The full RSRP sweep may be performed, at 906, for the first resource evaluation for the first slot. The RSRP sweep may be performed by the RSRP sweep component 1040 of the apparatus 1002 in FIG. 10.

At 910, the wireless device performs the full RSRP sweep for a second slot that is a number of slots following the first slot to determine a second resource exclusion RSRP threshold. The full RSRP sweep may be similar to the full RSRP sweep described for 906 (e.g., starting from $\rho_{thresh}^0$ and incrementing the RSRP threshold until a candidate set is at least x % of the total resources). In an example, the wireless device may perform the full RSRP sweep every 10 slots. The example of 10 slots is merely one example to illustrate the concept. The concept may be applied to any number of slots, e.g., performing the full RSRP sweep at a periodicity of more than 10 slots or less than 10 slots. The RSRP sweep may be performed by the RSRP sweep component 1040 of the apparatus 1002 in FIG. 10.

At 908, the wireless device performs a resource reevaluation for each slot between the first slot and the second slot based on the first resource exclusion RSRP threshold determined for the first slot. Thus, the wireless device may determine $\rho_{thresh}^1$ as the threshold for the first slot and may apply it in each of the slots between the first slot and the second slot. For example, if the second slot is the 20$^{th}$ slot, the wireless device may perform the resource reevaluation in the second through the 19$^{th}$ slot using $\rho_{thresh}^1$ as the initial resource exclusion RSRP threshold. The performance of the resource reevaluation, at 808, for each slot between the first slot and the second slot may include determining an updated resource exclusion RSRP threshold using the first resource exclusion RSRP threshold as an initial resource exclusion RSRP threshold. The resource reevaluation may be performed, e.g., by the resource evaluation component 1044 of the apparatus 1002 in FIG. 10.

In some examples, the wireless device may be configured with an algorithm to use for resource reevaluation. For example, at 902, the wireless device may receive a configuration indicating to perform the full RSRP sweep using a defined RSRP or a configured RSRP as an initial resource exclusion RSRP threshold after the number of slots and to use the first resource exclusion RSRP threshold for the slots between the first slot and the second slot. Thus, the wireless device may receive a configuration to use the second type of resource reevaluation (e.g., performing a full RSRP sweep every n slots), as described in connection with 7C. The configuration may further include one or more of: the number of slots between the first slot and the third slot when the full RSRP sweep is to be performed, a candidate resource free threshold for the resource reevaluation (e.g., x %, which may be indicated as a fraction, a percentage, etc.), an initial resource exclusion RSRP (e.g., $\rho_{thresh}^0$) or a step size for resource exclusion RSRP increments or decrements. The configuration may be received by the configuration component 1048 of the apparatus 1002 in FIG. 10.

Figure 10:
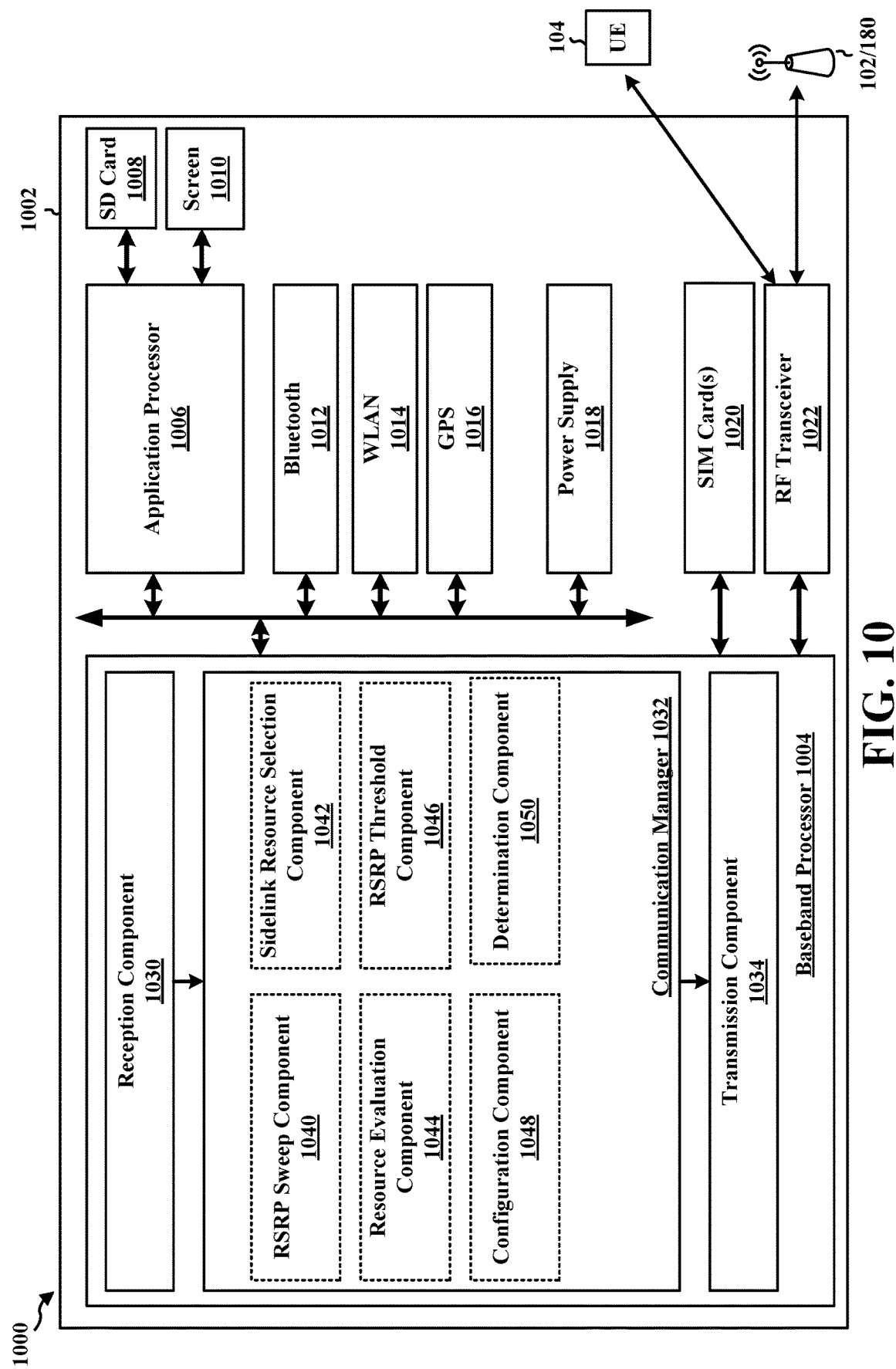
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, or another device capable of communicating based on sidelink and includes a baseband processor 1004 (also referred to as a modem) coupled to an RF transceiver 1022. In some aspects, the baseband processor 1004 may be a cellular baseband processor, and the RF transceiver may be a cellular RF transceiver. The apparatus may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and/or a power supply 1018. The baseband processor 1004 communicates through the RF transceiver 1022 with the UE 104 and/or BS 102/180. The baseband processor 1004 may include a computer-readable medium/memory. The computer-readable medium/memory may be non-transitory. The baseband processor 1004 is responsible for general processing, including the execution of software stored on the computer-readable medium/memory. The software, when executed by the baseband processor 1004, causes the baseband processor 1004 to perform the various functions described supra. The computer-readable medium/memory may also be used for storing data that is manipulated by the baseband processor 1004 when executing software. The baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband processor 1004. The baseband processor 1004 may be a component of the device 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire wireless device (e.g., see 350 of FIG. 3) and include the additional modules of the apparatus 1002.

The communication manager 1032 includes an RSRP sweep component 1040 that is configured to perform an RSRP sweep to determine a resource exclusion RSRP threshold, e.g., as described in connection with any of 810, 820, 906, and/or 910 in FIGS. 8 and/or 9. The communication manager 1032 further includes a sidelink resource selection component 1042 that is configured to select one or more sidelink resources for a transmission or a retransmission, e.g., as described in connection with 812. The sidelink resource selection component 1042 that may be configured to maintain a set of candidate resources for sidelink transmission and to adjust the sidelink candidate resources, e.g., as described in connection with 815 in FIG. 8.

The communication manager 1032 further includes a resource evaluation component 1044 that is configured to perform a first resource evaluation (e.g., with a full RSRP sweep), e.g., as described in connection with 808 and/or 904 in FIGS. 8 and 9. The resource evaluation component 1044 is configured to perform a resource reevaluation for a second slot based on the first resource exclusion RSRP threshold from the first slot, e.g., as described in connection with 814 in FIG. 8, or for each slot between the first slot and the third slot, e.g., as described in connection with 908 in FIG. 9. The resource evaluation component 1044 may be configured to perform the resource reevaluation for each slot between the first slot and the third slot based on a prior resource exclusion RSRP threshold from a prior slot, e.g., as described in connection with 818 in FIG. 8. The communication manager 1032 may further include a determination component 1050 configured to determine the number of slots between the first slot and the third slot when the full RSRP sweep is performed, e.g., as described in connection with 806 in FIG. 8.

The communication manager 1032 may further include an RSRP threshold component 1046 that is configured to store RSRP thresholds for resource evaluation, such as storing the second resource exclusion RSRP threshold, e.g., as described in connection with 816 in FIG. 8.

The communication manager 1032 may further include a configuration component 1048 that is configured to receive a configuration indicating to use a resource exclusion RSRP threshold from a prior slot to perform the resource reevaluation, e.g., as described in connection with 802 in FIG. 8. The configuration component 1048 may be configured to receive a configuration to use a prior resource exclusion RSRP threshold from a prior slot to perform the resource reevaluation for N slots and to perform the full RSRP sweep after N slots, e.g., as described in connection with 804 in FIG. 8. The configuration component 1048 may be configured to receive a configuration to perform a full RSRP sweep after N slots and to perform resource reevaluation using a first resource exclusion RSRP threshold for N slots, e.g., as described in connection with 902 in FIG. 9.

The apparatus 1002 may include components that perform each of the blocks of the algorithm in the flowcharts of FIGS. 8 and/or 9. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002 for wireless communication, and in particular the processor 1004 may include means for performing any of the steps of the methods described in connection with FIGS. 8 and 9. The means may be one or more of the components of the apparatus and/or a processing system of the apparatus configured to perform the functions recited by the means. The processing system may include the TX processor 316, 368, the RX processor 370, 356, and the controller/processor 375, 359. As such, in one configuration, the means may be the TX processor 316, 368, the RX processor 370, 356, and the controller/processor 375, 359 configured to perform the functions recited by the means.

Latency and reliability of sidelink communication may be improved if a wireless device reevaluates selected sidelink resources frequently, e.g., per slot. The computation for a per slot resource reevaluation involves a significant amount of processing by the wireless device, e.g., due to multiple iterations of candidate resource consideration to determine an appropriate RSRP threshold for determining candidate resource set. Aspects presented herein enable the wireless device to perform more frequent resource reevaluation, such as on per slot basis, with reduced processing by the UE. The present disclosure provides for a UE to perform a full RSRP sweep for a first slot to determine a first resource exclusion RSRP threshold, select sidelink resources for a transmission, and then to perform a resource reevaluation for a second slot based on the first resource exclusion RSRP threshold from the first slot. By using the resource exclusion RSRP threshold for a prior slot rather than performing a full RSRP sweep, the UE may reduce the amount of processing to reevaluate resources for that slot. The more frequent resource reevaluation of the present disclosure provides for improved latency and reliability in combination with more efficient processing through the use of the resource exclusion RSRP threshold from a prior slot.

The following example aspects are illustrative only and aspects thereof may be combined with aspects of other examples or teaching described herein, without limitation.

Aspect 1 is a method of wireless communication, comprising: performing a full RSRP sweep for a first slot to determine a first resource exclusion RSRP threshold; and performing a resource reevaluation for a second slot based on the first resource exclusion RSRP threshold from the first slot.

In aspect 2, the method of aspect 1 further includes selecting one or more sidelink candidate resources for a sidelink transmission based on the full RSRP sweep for the first slot; and adjusting the one or more sidelink candidate resources for the sidelink transmission based on the resource reevaluation for the second slot.

In aspect 3, the method of aspect 1 or aspect 2 further includes determining a second resource exclusion RSRP threshold, as a part of performing the resource reevaluation for the second slot; and storing the second resource exclusion RSRP threshold for use in a following slot.

In aspect 4, the method of aspect 3 further includes using the first resource exclusion RSRP threshold as an initial resource exclusion RSRP threshold to perform the resource reevaluation for the second slot.

In aspect 5, the method of aspect 3 further includes incrementing or decrementing an initial resource exclusion RSRP threshold to determine configured resource free criteria; and storing an updated resource exclusion RSRP threshold for a third slot.

In aspect 6, the method of any of aspects 1-5 further includes using a defined RSRP or a configured RSRP as an initial resource exclusion RSRP threshold to determine the first resource exclusion RSRP threshold.

In aspect 7, the method of any of aspects 1-6 further includes performing a first resource evaluation for the first slot, wherein the full RSRP sweep is performed for the first resource evaluation for the first slot.

In aspect 8, the method of any of aspects 1-6 further includes receiving a configuration indicating to use a resource exclusion RSRP threshold from a prior slot to perform the resource reevaluation, wherein the configuration further includes one or more of: a candidate resource free threshold for the resource reevaluation, an initial resource exclusion RSRP, or a step size for resource exclusion RSRP increments or decrements.

In aspect 9, the method of any of aspects 1-4 or 6-8 further includes performing the full RSRP sweep for a third slot using a defined RSRP or a configured RSRP as an initial resource exclusion RSRP threshold, the third slot being a number of slots following the first slot.

In aspect 10, the method of aspect 9 further includes receiving a configuration indicating to use a prior resource exclusion RSRP threshold from a prior slot to perform the resource reevaluation for slots between the first slot and the third slot and to perform the full RSRP sweep using the defined RSRP or the configured RSRP as the initial resource exclusion RSRP threshold after the number of slots, wherein the configuration further includes one or more of: the number of slots between the first slot and the third slot when the full RSRP sweep is performed, a resource free threshold for the resource reevaluation, an initial resource exclusion RSRP, or a step size for resource exclusion RSRP increments or decrements.

In aspect 11, the method of aspect 9 further includes determining, autonomously, the number of slots between the first slot and the third slot when the full RSRP sweep is performed.

In aspect 12, the method of aspect 9 further includes performing the resource reevaluation for each slot between the first slot and the third slot based on a prior resource exclusion RSRP threshold from a prior slot.

Aspect 13 is an apparatus for wireless communication, comprising a memory and at least one processor coupled to the memory, the memory and the at least one processor being configured to: perform a full RSRP sweep for a first slot to determine a first resource exclusion RSRP threshold; and perform a resource reevaluation for a second slot based on the first resource exclusion RSRP threshold from the first slot.

In aspect 14, the apparatus of aspect 13 further includes the memory and the at least one processor being configured to perform the method of any of aspects 2-12.

In aspect 15, the apparatus of aspect 13 or 14 further includes a transceiver.

Aspect 16 is an apparatus for wireless communication, comprising means for performing a RSRP sweep for a first slot to determine a first resource exclusion RSRP threshold; and means for performing a resource reevaluation for a second slot based on the first resource exclusion RSRP threshold from the first slot.

In aspect 17, the apparatus of aspect 16 further comprises means to perform the method of any of aspects 2-12.

In aspect 18, the apparatus of aspect 16 or 17 further includes a transceiver as a part of the means.

Aspect 19 is a non-transitory computer-readable storage medium storing computer executable code at a base station, the code when executed by a processor causes the processor to: perform a full RSRP sweep for a first slot to determine a first resource exclusion RSRP threshold; and perform a resource reevaluation for a second slot based on the first resource exclusion RSRP threshold from the first slot.

In aspect 20, the computer-readable medium of aspect 19 further includes code, that when executed by a processor causes the processor to perform the method of any of aspects 2-12.

Aspect 21 is a method of wireless communication, comprising: performing a full RSRP sweep for a first slot to determine a first resource exclusion RSRP threshold; performing the full RSRP sweep for a second slot that is a number of slots following the first slot to determine a second resource exclusion RSRP threshold; and performing a resource reevaluation for each slot between the first slot and the second slot based on the first resource exclusion RSRP threshold determined for the first slot.

In aspect 22, the method of aspect 21 further includes performing the resource reevaluation for each slot between the first slot and the second slot includes determining an updated resource exclusion RSRP threshold using the first resource exclusion RSRP threshold as an initial resource exclusion RSRP threshold.

In aspect 23, the method of aspect 21 or aspect 22 further includes using a defined RSRP or a configured RSRP as an initial resource exclusion RSRP threshold to determine the first resource exclusion RSRP threshold.

In aspect 24, the method of any of aspects 21-23 further includes performing a first resource evaluation for the first slot, wherein the full RSRP sweep is performed for the first resource evaluation for the first slot.

In aspect 25, the method of any of aspects 21-24 further includes receiving a configuration indicating to perform the full RSRP sweep using a defined RSRP or a configured RSRP as an initial resource exclusion RSRP threshold after the number of slots and to use the first resource exclusion RSRP threshold for the slots between the first slot and the second slot, wherein the configuration further includes one or more of: the number of slots between the first slot and the second slot when the full RSRP sweep is performed, a resource free threshold for the resource reevaluation, an initial resource exclusion RSRP, or a step size for resource exclusion RSRP increments or decrements.

Aspect 26 is an apparatus for wireless communication, comprising: a memory; and at least one processor coupled to the memory, the memory and the at least one processor configured to: perform a full RSRP sweep for a first slot to determine a first resource exclusion RSRP threshold; perform the full RSRP sweep for a second slot that is a number of slots following the first slot to determine a second resource exclusion RSRP threshold; and perform a resource reevaluation for each slot between the first slot and the second slot based on the first resource exclusion RSRP threshold determined for the first slot.

In aspect 27, the apparatus of aspect 26 further includes the memory and the at least one processor being configured to perform the method of any of aspects 21-25.

In aspect 28, the apparatus of aspect 26 or aspect 27 further includes a transceiver.

Aspect 29 is an apparatus for wireless communication, comprising means for performing a full RSRP sweep for a first slot to determine a first resource exclusion RSRP threshold; means for performing the full RSRP sweep for a second slot that is a number of slots following the first slot to determine a second resource exclusion RSRP threshold; and means for performing a resource reevaluation for each slot between the first slot and the second slot based on the first resource exclusion RSRP threshold determined for the first slot.

In aspect 30, the apparatus of aspect 29 further comprises means to perform the method of any of aspects 21-25.

In aspect 31, the apparatus of aspect 29 or 30 further includes a transceiver as a part of the means.

Aspect 32 is a non-transitory computer-readable storage medium storing computer executable code at a base station, the code when executed by a processor causes the processor to: perform a full RSRP sweep for a first slot to determine a first resource exclusion RSRP threshold; perform the full RSRP sweep for a second slot that is a number of slots following the first slot to determine a second resource exclusion RSRP threshold; and perform a resource reevaluation for each slot between the first slot and the second slot based on the first resource exclusion RSRP threshold determined for the first slot.

In aspect 33, the computer-readable medium of aspect 32 further includes code, that when executed by a processor causes the processor to perform the method of any of aspects 21-25.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
performing a full reference signal receive power (RSRP) sweep for a first slot using a defined RSRP or a configured RSRP as an initial resource exclusion RSRP threshold and incrementing or decrementing the initial resource exclusion RSRP threshold to determine a first resource exclusion RSRP threshold;
selecting one or more sidelink candidate resources for a sidelink transmission based on the full RSRP sweep for the first slot; and
performing a resource reevaluation for a second slot, the resource reevaluation for the second slot including one or more iterations of candidate resource consideration using the first resource exclusion RSRP threshold from the first slot as the initial resource exclusion RSRP threshold to determine a second resource exclusion RSRP threshold for resource selection in the second slot.

2. The method of claim 1, further comprising:
adjusting the one or more sidelink candidate resources for the sidelink transmission based on the resource reevaluation for the second slot.

3. The method of claim 1, further comprising:
storing the second resource exclusion RSRP threshold for use in a following slot.

4. The method of claim 3, wherein the initial resource exclusion RSRP threshold is incremented or decremented to determine configured resource free criteria, the method further comprising:
storing an updated resource exclusion RSRP threshold for a third slot.

5. The method of claim 1, further comprising:
performing a first resource evaluation for the first slot, wherein the full RSRP sweep is performed for the first resource evaluation for the first slot.

6. The method of claim 1, further comprising:
receiving a configuration indicating to use a resource exclusion RSRP threshold from a prior slot to perform the resource reevaluation, wherein the configuration further includes one or more of:
a candidate resource free threshold for the resource reevaluation,
an initial resource exclusion RSRP, or
a step size for resource exclusion RSRP increments or decrements.

7. The method of claim 1, further comprising:
performing the full RSRP sweep for a third slot using the defined RSRP or the configured RSRP as the initial resource exclusion RSRP threshold, the third slot being a number of slots following the first slot.

8. The method of claim 7, further comprising:
receiving a configuration indicating to use a prior resource exclusion RSRP threshold from a prior slot to perform the resource reevaluation for slots between the first slot and the third slot and to perform the full RSRP sweep using the defined RSRP or the configured RSRP as the initial resource exclusion RSRP threshold after the number of slots, wherein the configuration further includes one or more of:
the number of slots between the first slot and the third slot when the full RSRP sweep is performed,
a resource free threshold for the resource reevaluation,
an initial resource exclusion RSRP, or
a step size for resource exclusion RSRP increments or decrements.

9. The method of claim 7, further comprising:
determining, autonomously, the number of slots between the first slot and the third slot when the full RSRP sweep is performed.

10. The method of claim 7, further comprising:
performing the resource reevaluation for each slot between the first slot and the third slot based on a prior resource exclusion RSRP threshold from a prior slot.

11. The method of claim 1, wherein the full RSRP sweep for the first slot uses the defined RSRP as the initial resource exclusion RSRP threshold.

12. The method of claim 1, wherein the full RSRP sweep for the first slot uses the configured RSRP as the initial resource exclusion RSRP threshold.

13. An apparatus for wireless communication at a wireless device, comprising:
memory; and
one or more processors coupled to the memory and configured to cause the wireless device to:
perform a full reference signal receive power (RSRP) sweep for a first slot using a defined RSRP or a configured RSRP as an initial resource exclusion RSRP threshold and increment or decrement the initial resource exclusion RSRP threshold to determine a first resource exclusion RSRP threshold;

select one or more sidelink candidate resources for a sidelink transmission based on the full RSRP sweep for the first slot; and perform a resource reevaluation for a second slot, the resource reevaluation for the second slot including one or more iterations of candidate resource consideration using the first resource exclusion RSRP threshold from the first slot as the initial resource exclusion RSRP threshold to determine a second resource exclusion RSRP threshold for resource selection in the second slot.

14. The apparatus of claim 13, wherein the one or more processors are further configured to cause the wireless device to:

adjust the one or more sidelink candidate resources for the sidelink transmission based on the resource reevaluation for the second slot.

15. The apparatus of claim 13, wherein the one or more processors are further configured to cause the wireless device to:

store the second resource exclusion RSRP threshold for use in a following slot.

16. The apparatus of claim 15, wherein the one or more processors are further configured to cause the wireless device to:

increment or decrement the initial resource exclusion RSRP threshold to determine configured resource free criteria; and store an updated resource exclusion RSRP threshold for a third slot.

17. The apparatus of claim 13, wherein the one or more processors are further configured to cause the wireless device to:

perform a first resource evaluation for the first slot based on the full RSRP sweep.

18. The apparatus of claim 13, wherein the one or more processors are further configured to cause the wireless device to:

receive a configuration indicating to use a resource exclusion RSRP threshold from a prior slot to perform the resource reevaluation, wherein the configuration further includes one or more of:
 a candidate resource free threshold for the resource reevaluation,
 an initial resource exclusion RSRP, or
 a step size for resource exclusion RSRP increments or decrements.

19. The apparatus of claim 13, wherein the one or more processors are further configured to cause the wireless device to:

perform the full RSRP sweep for a third slot using the defined RSRP or the configured RSRP as the initial resource exclusion RSRP threshold, the third slot being a number of slots following the first slot.

20. The apparatus of claim 19, wherein the one or more processors are further configured to cause the wireless device to:

receive a configuration indicating to use a prior resource exclusion RSRP threshold from a prior slot to perform the resource reevaluation for slots between the first slot and the third slot and to perform the full RSRP sweep using the defined RSRP or the configured RSRP as the initial resource exclusion RSRP threshold after the number of slots, wherein the configuration further includes one or more of:
 the number of slots between the first slot and the third slot when the full RSRP sweep is performed,
 a resource free threshold for the resource reevaluation,
 an initial resource exclusion RSRP, or
 a step size for resource exclusion RSRP increments or decrements.

21. The apparatus of claim 19, wherein the one or more processors are further configured to cause the wireless device to:

determine, autonomously, the number of slots between the first slot and the third slot when the full RSRP sweep is performed.

22. The apparatus of claim 19, wherein the one or more processors are further configured to cause the wireless device to:

perform the resource reevaluation for each slot between the first slot and the third slot based on a prior resource exclusion RSRP threshold from a prior slot.

23. The apparatus of claim 13, wherein the full RSRP sweep for the first slot uses the defined RSRP as the initial resource exclusion RSRP threshold.

24. The apparatus of claim 13, wherein the full RSRP sweep for the first slot uses the configured RSRP as the initial resource exclusion RSRP threshold.

25. The apparatus of claim 13, wherein the wireless device is a user equipment (UE).

26. The apparatus of claim 13, wherein the one or more processors are configured individually or in combination to cause the wireless device to perform the full RSRP sweep for the first slot, select the one or more sidelink candidate resources, and perform the resource reevaluation for the second slot.

27. A method of wireless communication, comprising:

performing a full reference signal receive power (RSRP) sweep for a first slot using a defined RSRP or a configured RSRP as an initial resource exclusion RSRP threshold and incrementing or decrementing the initial resource exclusion RSRP threshold to determine a first resource exclusion RSRP threshold;

performing the full RSRP sweep for a second slot that is a number of slots following the first slot to determine a second resource exclusion RSRP threshold; and performing a resource reevaluation for each slot between the first slot and the second slot the resource reevaluation for each slot including one or more iterations of candidate resource consideration using the first resource exclusion RSRP threshold determined for the first slot as the initial resource exclusion RSRP threshold to determine an updated resource exclusion RSRP threshold for resource selection.

28. The method of claim 27, further comprising:

selecting one or more sidelink candidate resources for a sidelink transmission based on the full RSRP sweep for the first slot.

29. The method of claim 27, further comprising:

performing a first resource evaluation for the first slot, wherein the full RSRP sweep is performed for the first resource evaluation for the first slot.

30. The method of claim 27, further comprising:

receiving a configuration indicating to perform the full RSRP sweep using the defined RSRP or the configured RSRP as the initial resource exclusion RSRP threshold after the number of slots and to use the first resource exclusion RSRP threshold for each slot between the first slot and the second slot, wherein the configuration further includes one or more of:
 the number of slots between the first slot and the second slot when the full RSRP sweep is performed,
 a resource free threshold for the resource reevaluation, an initial resource exclusion RSRP, or
a step size for resource exclusion RSRP increments or decrements.

31. An apparatus for wireless communication at a wireless device, comprising:
memory; and
one or more processors coupled to the memory and configured to cause the wireless device to:
perform a full reference signal receive power (RSRP) sweep for a first slot using a defined RSRP or a configured RSRP as an initial resource exclusion RSRP threshold and incrementing or decrementing the initial resource exclusion RSRP threshold to determine a first resource exclusion RSRP threshold;
perform the full RSRP sweep for a second slot that is a number of slots following the first slot to determine a second resource exclusion RSRP threshold; and
perform a resource reevaluation for each slot between the first slot and the second slot, the resource reevaluation for each slot including one or more iterations of candidate resource consideration using the first resource exclusion RSRP threshold determined for the first slot as the initial resource exclusion RSRP threshold to determine an updated resource exclusion RSRP threshold for resource selection.

32. The apparatus of claim 31, wherein the one or more processors are further configured to cause the wireless device to:
select one or more sidelink candidate resources for a sidelink transmission based on the full RSRP sweep for the first slot.

33. The apparatus of claim 31, wherein the wireless device is a user equipment (UE).

34. The apparatus of claim 31, wherein the one or more processors are configured individually or in combination to cause the wireless device to perform the full RSRP sweep for the first slot, perform the full RSRP sweep for the second slot, and perform the resource reevaluation for each slot between the first slot and the second slot.

35. A non-transitory computer-readable medium storing computer executable code for wireless communication at a wireless device, the code when executed by one or more processors causes the wireless device to:
perform a full reference signal receive power (RSRP) sweep for a first slot using a defined RSRP or a configured RSRP as an initial resource exclusion RSRP threshold and increment or decrement the initial resource exclusion RSRP threshold to determine a first resource exclusion RSRP threshold;
select one or more sidelink candidate resources for a sidelink transmission based on the full RSRP sweep for the first slot; and
perform a resource reevaluation for a second slot, the resource reevaluation for the second slot including one or more iterations of candidate resource consideration using the first resource exclusion RSRP threshold from the first slot as the initial resource exclusion RSRP threshold to determine a second resource exclusion RSRP threshold for resource selection in the second slot.

36. The non-transitory computer-readable medium of claim 35, wherein the code when executed by the one or more processors further causes the wireless device to:
store the second resource exclusion RSRP threshold for use in a following slot.

37. The non-transitory computer-readable medium of claim 35, wherein the code when executed by the one or more processors further causes the wireless device to:
perform the full RSRP sweep for a third slot using the defined RSRP or the configured RSRP as the initial resource exclusion RSRP threshold, the third slot being a number of slots following the first slot.

38. The non-transitory computer-readable medium of claim 37, wherein the code when executed by the one or more processors further causes the wireless device to:
receive a configuration indicating to use a prior resource exclusion RSRP threshold from a prior slot to perform the resource reevaluation for slots between the first slot and the third slot and to perform the full RSRP sweep using the defined RSRP or the configured RSRP as the initial resource exclusion RSRP threshold after the number of slots, wherein the configuration further includes one or more of:
the number of slots between the first slot and the third slot when the full RSRP sweep is performed,
a resource free threshold for the resource reevaluation,
an initial resource exclusion RSRP, or
a step size for resource exclusion RSRP increments or decrements.

39. The non-transitory computer-readable medium of claim 37, wherein the code when executed by the one or more processors further causes the wireless device to:
perform the resource reevaluation for each slot between the first slot and the third slot based on a prior resource exclusion RSRP threshold from a prior slot.

40. A non-transitory computer-readable medium storing computer executable code for wireless communication at a wireless device, the code when executed by one or more processors causes the wireless device to:
perform a full reference signal receive power (RSRP) sweep for a first slot using a defined RSRP or a configured RSRP as an initial resource exclusion RSRP threshold and incrementing or decrementing the initial resource exclusion RSRP threshold to determine a first resource exclusion RSRP threshold;
perform the full RSRP sweep for a second slot that is a number of slots following the first slot to determine a second resource exclusion RSRP threshold; and
perform a resource reevaluation for each slot between the first slot and the second slot, the resource reevaluation for each slot including one or more iterations of candidate resource consideration using the first resource exclusion RSRP threshold determined for the first slot as the initial resource exclusion RSRP threshold to determine an updated resource exclusion RSRP threshold for resource selection.

41. The non-transitory computer-readable medium of claim 40, wherein the code when executed by the one or more processors further causes the wireless device to:
select one or more sidelink candidate resources for a sidelink transmission based on the full RSRP sweep for the first slot.

* * * * *